United States Patent Office 3,083,168
Patented Mar. 26, 1963

3,083,168
FOAM SUPPRESSION
David W. Young, Homewood, Ill., assignor, by mesne assignments, to Sinclair Research Inc., New York, N.Y., a corporation of Delaware
No Drawing. Filed Feb. 17, 1959, Ser. No. 793,696
8 Claims. (Cl. 252—321)

This invention is drawn to a method for suppressing foam in oleaginous liquids which are subjected to pressures less than about 100 mm. Hg (absolute). The method comprises subjecting the oleaginous liquid base oil to reduced pressure in the presence of a small but effective amount of a glycol titanate. The preferred titanate is a normally solid glycol titanate polymer having a molecular weight of at least about 1000. The titanate is normally incorporated in an amount of about 0.01 to 1% by weight of the total composition, preferably about 0.01 to 0.1%, but a greater percentage in very viscous liquids.

The oleaginous liquids, the foaming of which may be suppressed or inhibited by the method of this invention are those in which the glycol titanate is compatible, i.e. soluble or otherwise dispersible in the base oil in the needed proportions. Such liquids include mineral oil products, derivatives of fixed oils and materials comparable to those derivatives, such as natural and synthetic esters. These liquids have a great tendency to foam upon agitation and it has become conventional to add to them minute amounts of silicone polymers. See U.S. Patent No. 2,589,317. However, it has been found that glycol titanates not only have properties similar to the silicones but also are effective foam suppressors at near-vacuum pressures where silicone polymers lose much of their effectiveness. This foam suppressing property is particularly valuable where the liquid composition is exposed to pressures such as below about 25 mm. of mercury (absolute), e.g. 10 or even 5 mm. of mercury, since other known foam suppressors do not inhibit foam sufficiently below about 25 mm. Hg pressure. The foaming tendency is usually caused by the liquid being under agitation and/or at an elevated temperature, e.g. frequently about 200 to 600° F. Thus, according to this invention, the foaming of the oleaginous liquid is suppressed or inhibited by incorporating in the base oil an amount of the glycol titanate sufficient to provide the desired foam inhibition.

The glycol titanate is a chelate complex which may be monomeric or polymeric in form and can contain about 0.5 to 4, preferably about 2 to 4 moles of glycol residue per atom of titanium. Although the structure of the polymer is uncertain, it is theorized that it maintains the "claw" structure of the chelate complex monomer or partial polymer from which it is made, since titanium polymers made from non-chelated titanates are not effective foam suppressors.

The glycol titanate chelate which may be used as a foam suppressor or from which the polymer foam suppressor can be made is characterized by a coordinate valence bond between an oxygen and a titanium atom. Such organo-titanium chelates are commercially available or they may also be easily manufactured by the reaction of a titanium tetraester such as a tetraalkyl titanate and a glycol or probably even by direct reaction between a suitable glycol and ortho titanic acid. The production of tetraalkyltitanates as well as organo-titanium chelates are described in U.S. Patent 2,643,262. Tetraalkyltitanates can be prepared by the esterification of ortho titanic acid with an alcohol. Suitable titanium esters for conversion to glycol titanate chelate complexes are alkyl titanates such as methyl, ethyl, propyl, butyl, 2-ethylhexyl, dodecyl, cyclohexyl and ethoxyethyl tetraesters; aryl tetraesters such as phenyl and beta-naphthyl tetratitanates; aralkyl esters such as benzyl tetratitanates and mixed esters including diethyl, diphenyl titanate.

The preferred glycol titanate chelate complexes are those prepared through the reaction of a titanium tetraester with a glycol of the 1,3-diol type. Preferably these glycols are 2,3-diorgano hydrocarbon substituted materials which have the formula:

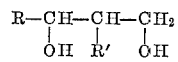

The diorgano radicals, that is the R and R' of the glycol formula, can be alkyl, aryl or mixed, and if desired, be substituted as with halogen, for instance chlorine. These glycols or others used in making the titanates may contain 2 to 24 carbon atoms. Among the specific glycols which can be employed are 2-ethyl-1,3-hexanediol, 2-propyl-1,3-heptanediol, 2-methyl-1,3-pentanediol, 2-butyl-1,3-butanediol, 2,4-diphenyl-1,3-butanediol, and 2,4-dimesityl-1,3-butanediol. The R and R' groups should be substantially non-reactive in the transesterification and polymerization and inert under the conditions to which the foam suppressed composition is exposed. Generally, the preferred glycols contain from about 5 to 12 carbon atoms, for instance an octaylene glycol; however, if desired, they could contain a greater number.

Usually the mere combination of a titanium tetraester and a glycol initiates an exothermic reaction, although if desired, heat can be employed to speed the alcoholysis. The glycol is reacted in the proportions of ½ part glycol to one part titanium ester to four parts glycol to one part titanium ester. The initial reaction may proceed only to the monomer stage or continue to a polymer product directly.

Since oxygen is an electron donor capable of forming a coordination bond with titanium (valence 4, coordination number 6), the 1,3-diols apparently form cyclic or chelated structures with titanium. This can be represented as:

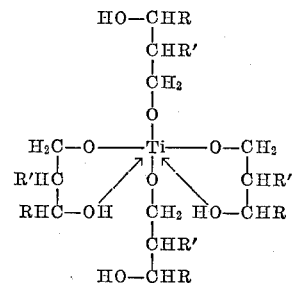

for a complex made by reacting 4 moles of glycol with one mole of tetratitanate where the arrow represents the coordinate or chelate forming bond and R and R' are hydrogen or monovalent hydrocarbon groups of the glycol. The glycol titanate chelate complex can be polymerized through heat, or through water addition and heating.

There is no particular critical limitation on the extent of either, except, of course, the temperature should not be so high as to decompose the desired reaction products. Ordinarily, the polymerization temperature will be above about 25° C. and preferably at least about 40° C. In the absence of water, the monomer may be dissolved in a solvent and heated. It may be desirable in this alternative to use a vacuum, say about 5 to 10 millimeters of mercury, and a temperature of about 130 to 170° C. to remove the solvent while forming the polymer. Other conditions of temperature and pressure can be employed. Among the suitable inert solvents which can be employed are cyclohexane, n-butane, benzene, etc. If water be present during polymerization at least one part of water per part of the original titanium chelate is usually employed, with 2 to 20 parts of water being used most advantageously. At the end of the reaction, alcohol and water can be boiled off or otherwise removed. The length of time the heating is conducted can be varied widely and is not critical, and apparently during polymerization nonchelated groups of the titanium reactant are hydrolyzed from the molecule.

These reaction products are relatively water-insensitive, i.e. they do not readily revert to $TiO_2$ when brought into contact with water. This is a distinct advantage in a commercial process since such a compound will not require anhydrous transportation and storage conditions. Complete insensitivity, however, is not required for successful use of a titanate in the process of the invention. The titanates are also compatible; that is, soluble, miscible or dispersible with most organic fluids which have foaming problems.

A possible structure of the polymer formed from 2-ethylhexanediol-1,3 titanate is

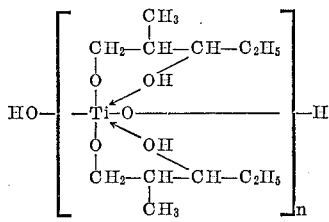

A commercially available chelate is "OGT–41." This is a composition containing 4 moles of octylene glycol (2-ethylhexanediol-1,3) to each mole of titanium dispersed in 40% by weight of butanol. This is a liquid which is insoluble in water but soluble in alcohol and hydrocarbons. Other chelates containing varying proportions of octylene glycol with titanium are available in the "OGT" series and these are also suitable for use as starting materials. These products are not distinct compounds; since they are not distillable or crystallizable they appear to be partially polymerized.

The glycol titanate chelate polymers are effective foam suppressing agents in a variety of organic liquids which may be subjected to agitation at below atmospheric pressure in their use. Light mineral oil fractions such as are used in gasoline and diesel fuel, kerosene and other fuel oil fractions as well as mineral oil, ester lubricants and other oleaginous liquids may be retarded in their foaming tendencies by the method of this invention.

Gasolines are usually blends of low boiling mineral oil fractions derived from distillation, cracking and other refining and chemical conversion processes practiced upon crude petroleum. A typical premium gasoline may contain a small amount of tetra lower alkyl lead compound as an anti-knock agent, together with small amounts of other non-hydrocarbon constituents used to impart various properties to the gasoline in its use in internal combustion engines. Such a gasoline may have a research method octane number of about 90 to 102 and a motor method octane number of about 80–95. For example, a gasoline having an API gravity of 52.6 and an ASTM distillation of:

|  | ° F. |
|---|---|
| IBP | 106 |
| 5% | 136 |
| 20% | 172 |
| 50% | 238 |
| 70% | 280 |
| EP | 385 | contained the following components (±5%):

|  | Percent |
|---|---|
| Full-range straight run naphtha reformate | 30 |
| Light fluid catalytically cracked gasoline | 30 |
| Heavy straight-run naphtha reformate | 30 |
| Butane | 10 |

Fuel oils are heavier than gasoline and include, for example, kerosenes, diesel fuels, domestic fuel oils, jet engine fuels such as JP–3, JP–4, JP–5 specification fuels and other broad or narrow petroleum or coal distillate fractions of similar boiling range. In general, these fuel oils have essentially an ASTM distillation range above about 175° F., for instance between about 200 to 700° F. with the 90% point being at least about 450° F. Certain of these fuels distill in the range of about 400° to 650° F., and more desirable of the fuels have API gravities of about 35 to 50.

The base oil to be foam suppressed may be a mineral oil base stock of lubricating viscosity and can be for instance a solvent extracted or solvent refined oil obtained in accordance with conventional methods of solvent refining lubricating oils. Generally, lubricating oils have viscosities from about 20 to 250 SUS at 210° F. The base oil may be derived from paraffinic, naphthenic, asphaltic or mixed base crudes and if desired, a blend of solvent refined Mid-Continent neutrals and Mid-Continent bright stocks may be employed. A popular lubricant is a solvent treated Mid-Continent neutral having a viscosity index of about 95. This lubricant generally contains extreme pressure agents, viscosity index improvers, oxidation inhibitors, etc.

The base oil may be a natural or synthetic ester oil. Castor oil has been used for many years as a lubricant. Synthetic diester, complex ester and polyester materials are finding increased use as lubricants. Generally the viscosity of ester lubricants ranges from the light to heavy oils, e.g. about 50 SUS at 100° F. to 250 SUS at 210° F., and preferably 30 to 150 SUS at 210° F. These esters are of improved thermal stability, low acid number, and high flash and fire points. These complex esters, diesters, monoesters and polyesters may be used alone or, to achieve the most desirable viscosity characteristics, complex esters, diesters and polyesters may be blended with each other or with naturally occurring esters like castor oil to produce lubricating compositions of wide viscosity ranges which can be "tailor-made" to meet various specifications. This blending is performed, for example, by stirring together a quantity of diester and complex ester at an elevated temperature, altering the proportions of each component until the desired viscosity is reached.

These esters are prepared fundamentally by the action of acids on alcohols. The mere mixture of an alcohol and acid at the proper temperature will react to produce an equilibrium mixture which includes the monoester. The same is true for the reactions of organic dibasic acids and glycols to produce synthetic lubricant polyester bright stocks. The diesters are frequently of the type alcohol-dicarboxylic acid-alcohol, while complex esters are generally of the type X—Y—Z—Y—X in which X represents a monoalcohol residue, Y represents a dicarboxylic acid residue and Z represents a glycol residue and the linkages are ester linkages. These esters have been found to be especially adaptable to the conditions to which turbine engines are exposed, since they can be formulated to give a desirable combination of high flash point, low pour point, and high viscosity at elevated temperatures, and need contain no additives which might leave a residue upon volatilization. In addition, many complex esters have shown good stability to shear.

Suitable mono and dicarboxylic acids used to make synthetic ester lubricant bases can be branched or straight chain and saturated or unsaturated and they contain from about 2 to 12 carbon atoms. The preferred acids are the saturated aliphatic dibasic acids which include, among others, succinic, adipic, diglycolic, suberic, azelaic, sebacic and "isosebacic" acids, which are mixtures of alpha-ethyl suberic acid, alpha-alpha'-diethyl adipic acid, and sebacic acid. The alcohols contain from 4 to 12 carbon atoms. The monohydric alcohols include, among others, butyl, hexyl, 2-ethylhexyl, dodecyl, cetyl and stearyl alcohols. The glycols and glycol ethers include ethylene glycol, propylene glycol, butylene glycol, triethylene glycol, diethylene glycol, ethylene glycol mono-2-ethylhexyl ether, diethylene glycol mono-n-butyl ether, propylene glycol mono-n-butyl ether, tripropylene glycol mono-ethyl ether, 2-ethyl-1,3-pentanediol, 2-ethyl-1,3-hexanediol, 2-isopropyl-1,3-hexanediol, etc. In general the useful glycols include the aliphatic monoglycols of 4 to 20 or 30 carbon atoms, preferably 4 to 12, and the polyglycols having from about 1 to 50 ether oxygen atoms obtained from monoglycols of 2 to 12 carbon atoms. Advantageously, the polyglycols contain from about 1 to 10 ether oxygen atoms and these can be of the formula $H(OC_xH_{2x})_nOH$ where $x$ is 2 to 4. The preferred polyglycols are the polyethylene and polypropylene glycols and those particularly useful have molecular weights from about 150 to 450.

Di-2-ethylhexyl sebacate (Plexol 201) and diisooctyl azelate (DiOAz) are preferred synthetic lubricant bases from the standpoint of economy, availability and satisfactory properties. DiOAz is a product made by the esterification of azelaic acid with an alcohol mixture made by the oxo process from $C_3$ to $C_4$ copolymer heptanes. This alcohol is commercially available as a mixture containing 17% 3,4-dimethylhexanol; 29% 3,5-dimethylhexanol; 25% 4,5-dimethylhexanol; 1.4% 5,5-dimethylhexanol; 16% of a mixture of 3-methylheptanol and 5-ethylheptanol; 2.3% 4-ethylhexanol; 4.3% alpha-alkyl alkanols and 5% other materials. Some other specific satisfactory diesters are di-(1,3-methylbutyl) adipate, di-(2-ethylbutyl) adipate, di-(1-ethylpropyl) adipate, diethyl oxalate and di-(undecyl) sebacate.

Materials normally incorporated in oil products to impart special characteristics can be added to the compositions of this invention. These include corrosion inhibitors, extreme pressure agents, antiwear agents, etc. The amount of additives included in the composition usually ranges from about 0.01 weight percent up to about 10 weight percent, and in general can be employed in any amounts desired so long as the composition is not unduly deleteriously affected.

The preparation of a glycol titanate polymer can be illustrated by the following specific example, which is not to be considered as limiting:

2-ethyl-1,3-hexanediol and tetra-n-butyl titanate were reacted as disclosed in the aforesaid Patent 2,643,262, to produce a chelated compound containing four moles of octylene glycol for each mole of titanium. 164 pounds of a solution of this product containing 40% butanol were weighed into a stainless steel Pfaudler kettle. While stirring vigorously, 210 pounds of tap water were added. The stirred mixture of water and precipitated polymer was heated to 170° F. over a twenty-minute period. When the mixture reached 170° F., the agitation was stopped, and the mixture was allowed to settle 1 hour. The upper organic layer and water were siphoned off the wet polymeric white solid. A second charge of tap water, 210 pounds, was added to the kettle, while agitating vigorously, and the mixture was heated to 170° F. The agitation was stopped, and the mixture was allowed to settle two hours. The bulk of the water was siphoned off the polymer; the last part of the water was drained through the wet granular polymer to the bottom valve on the kettle and discarded. 147 pounds of "Plexol 201" (di-[2-ethylhexyl] sebacate) were then charged to the stirred kettle, and the contents heated to 180° F., at which temperature the polymer dissolved. The agitation was stopped, and the solution settled for 30 minutes. The lower water layer was drawn off, and discarded. At this point the organic layer was almost clear, except for a slight water haze. The organic layer was dehydrated by heating to 250° F. and cooled to 80° F. Product yield was 190 pounds of clear yellow liquid containing 20 weight percent polymer and having the following analysis.

Kinematic viscosity:
 At 100° F., cs _____ 16.47
 At 210° F., cs _____ 3.691
Titanium wt. percent _____ 3.20
Acid number (ASTM–D974) _____ 3.10

The presence of the glycol titanate, as pointed out above, is of particular value when the oleaginous base is subjected to reduced pressures below 100 mm. Hg. These low pressures may occur not only in the use of the finished products but also in their manufacture. For example, when an isooctyl ($C_8$-oxo) alcohol-azelate-neopentyl glycol-azelate-isooctyl alcohol complex ester lubricant was formulated and 0.03% titanium chelate polymer of the above example was added, a 1,000 gram sample, heated in a Cohen still at 5 mm. Hg absolute from 26° C. or about 75° F. to 400° F. in 78 minutes, and then held at 400° F. and 5 mm. Hg absolute for 15 minutes showed 0.21% complex ester foam over. When the same study was made without the titanium polymer the foam over in the Cohen still was 16.8%.

Also, when a complex ester lubricant was formulated by reacting 2 moles of neopentyl glycol, 2 moles sebacic acid and 2 moles of isooctyl (oxo) alcohol, using 0.1% p-toluene sulfonic acid as a catalyst and a volume of toluene equal to the volume of reactants as a water-entraining agent, the product required distillation in a Cohen still to remove the excess reactants, toluene and water from the product. Before being placed in the still, the product was divided into two parts. 0.3 percent glycol titanate polymer of the above example was added to one part which was placed in the still under 3–5 mm. Hg pressure and brought to a temperature of 200° C. in 2 hours. Foam-over was less than 3%. The other half of this batch of complex ester, when subjected to the same conditions but without the presence of glycol titanate, had a foam-over of about 12% even though slower heating, requiring 5 hours to attain a temperature of 200° C., was practiced.

The incorporation of a glycol titanate chelate in hydrocarbon solvents such as dry cleaning fluids and paint thinners is effective to suppress foam in these oleaginous base oils as well as in light oils, mineral oils and synthetic oils. They also are effective in the presence of traces of polysilicones. However, glycol titantes seem more active as defoamers in synthetic oils if polysilicones are not present. It is to be noted that all titanium polymers are not defoamers for oils as a high molecular weight polymer made from $TiCl_4$, alcohol, ammonia and traces of water has not been found to be a defoamer.

I claim:

1. A method of suppressing foam in an oleaginous liquid at a reduced pressure of less than about 100 mm. Hg which comprises subjecting the liquid to said reduced pressure in the presence of a small but effective foam-suppressing amount of a glycol titanate compatible with the oleaginous liquid.

2. The method of claim 1 in which the glycol titanate is of a 1,3-glycol.

3. The method of claim 1 in which the pressure is less than about 25 mm. Hg.

4. The method of claim 2 in which the titanate is a glycol titanate polymer.

5. The method of claim 4 where the polymer is a 1,3-octylene glycol titanate polymer.

6. The method of claim 4 where the polymer is present in an amount of about 0.01 to 1.0% of the weight of the liquid.

7. The method of claim 4 where the polymer is present in an amount of about 0.01 to 0.1%.

8. The method of claim 4 in which the oleaginous liquid is a synthetic aliphatic ester of lubricating viscosity.

References Cited in the file of this patent

UNITED STATES PATENTS

| | | |
|---|---|---|
| 2,643,262 | Bostwick | June 23, 1953 |
| 2,795,553 | Lowe | June 11, 1957 |